United States Patent
Jorda

(10) Patent No.: US 11,731,905 B2
(45) Date of Patent: Aug. 22, 2023

(54) EMULSIFYING COMPOSITION FOR SPREADING BITUMEN

(71) Applicant: Arkema France, Colombes (FR)

(72) Inventor: Eric Jorda, Lyons (FR)

(73) Assignee: Arkema France, Colombes (FR)

( * ) Notice: Subject to any disclaimer, the term of this patent is extended or adjusted under 35 U.S.C. 154(b) by 799 days.

(21) Appl. No.: 16/606,051

(22) PCT Filed: Apr. 17, 2018

(86) PCT No.: PCT/FR2018/050968
§ 371 (c)(1),
(2) Date: Oct. 17, 2019

(87) PCT Pub. No.: WO2018/193206
PCT Pub. Date: Oct. 25, 2018

(65) Prior Publication Data
US 2020/0039880 A1  Feb. 6, 2020

(30) Foreign Application Priority Data

Apr. 21, 2017  (FR) .................... 1753498

(51) Int. Cl.
C04B 26/26 (2006.01)
C04B 24/12 (2006.01)
C04B 24/26 (2006.01)
C04B 40/00 (2006.01)

(52) U.S. Cl.
CPC ............ C04B 26/26 (2013.01); C04B 24/121 (2013.01); C04B 24/124 (2013.01); C04B 24/128 (2013.01); C04B 24/2641 (2013.01); C04B 40/0039 (2013.01)

(58) Field of Classification Search
None
See application file for complete search history.

(56) References Cited

U.S. PATENT DOCUMENTS

| | | | |
|---|---|---|---|
| 3,169,113 A * | 2/1965 | Kirkpatrick | C09K 8/64 507/923 |
| 3,979,309 A | 9/1976 | Geiser | |
| 5,951,199 A * | 9/1999 | Matsushita | C04B 26/26 404/17 |
| 9,896,617 B2 * | 2/2018 | Dwarakanath | C09K 8/588 |
| 10,479,925 B2 * | 11/2019 | Pandya | C09K 8/54 |
| 2009/0025607 A1 * | 1/2009 | Koenders | C04B 26/26 106/284.06 |
| 2011/0041728 A1 | 2/2011 | Godivier et al. | |
| 2013/0228095 A1 * | 9/2013 | Miles | C09D 5/08 106/14.42 |
| 2014/0116708 A1 * | 5/2014 | Wadekar | E21B 43/25 507/242 |
| 2017/0137323 A1 * | 5/2017 | Wang | C04B 24/126 |
| 2017/0204268 A1 | 7/2017 | Delfosse et al. | |
| 2018/0079976 A1 * | 3/2018 | Tort | C04B 24/302 |
| 2020/0362100 A1 * | 11/2020 | Jorda | C08G 63/6854 |

FOREIGN PATENT DOCUMENTS

| | | |
|---|---|---|
| AU | 2060483 A | 7/1984 |
| EP | 0179510 A1 | 4/1986 |
| EP | 0416682 A1 | 3/1991 |
| FR | 2930253 A1 | 10/2009 |
| FR | 2971511 A1 | 8/2012 |
| JP | 59123523 A | 7/1984 |
| WO | 2014154985 A2 | 10/2014 |
| WO | 2016005591 A1 | 1/2016 |

OTHER PUBLICATIONS

Kirk Othmer—Encyclopedia of Chemical Technology, Third Edition, vol. 7, 16 pages, Dimer Acids, Humko Sheffield, (1975).
International Search Report and Written Opinion for International Application No. PCT/FR2018/050968, dated Sep. 20, 2018, 7 pages.

* cited by examiner

*Primary Examiner* — John J Figueroa
(74) *Attorney, Agent, or Firm* — RatnerPrestia

(57) ABSTRACT

Provided is an aqueous acidic emulsifying composition comprising a specific amine and a polymerized fatty acid, a process for preparing the composition, a process for preparing bituminous emulsion and to the use of the composition for spreading bitumen.

16 Claims, No Drawings

EMULSIFYING COMPOSITION FOR SPREADING BITUMEN

CROSS-REFERENCE TO RELATED APPLICATIONS

This is the national phase of International Application No. PCT/FR2018/050968, filed 17 Apr. 2018, which claims priority to French Application No. 1753498, filed 21 Apr. 2017. The disclosure of each of these applications is incorporated herein by reference in its entirety for all purposes.

FIELD OF THE INVENTION

The invention relates to an aqueous acidic emulsifying composition comprising a specific amine and a polymerized fatty acid, to a process for preparing said composition, to a process for preparing bituminous emulsion and to the use of said composition for spreading bitumen.

BACKGROUND OF THE INVENTION

In the context of the present invention, bitumen is intended to mean bituminous binders or products or more simply binder, natural bitumen, bitumens originating from a mineral oil and the resulting mixtures. Bitumens obtained by cracking and tars are also considered here to be bituminous products within the meaning of the present invention, as are the mixtures which may result therefrom.

Residues of vacuum distillation, of distillation, of precipitation (as for example with propane), blown bitumens are examples considered in the context of this invention.

Synthetic road binders or road binders of plant origin containing modified or unmodified natural resins in a mixture with oils of plant origin or derivatives thereof are also considered. Some synthetic bitumens are also sometimes referred to as clear, pigmentable or colorable bitumens. These bitumens contain little or no asphaltenes and can consequently be colored. These bitumens are based on petroleum resin and/or on indene-coumarone resin and on lubricating oil, as described for example in document EP179510.

Bitumens diluted using petroleum solvents, bitumens diluted using plant oils, and bitumen emulsions are also considered here.

Finally, bitumens modified by polymers are also considered here. As polymer, mention may for example, and by way of nonlimiting indication, be made of thermoplastic elastomers such as linear or star-branched styrene/butadiene (SBR, SBS) or styrene/isoprene (SIS) random or block copolymers, which are optionally crosslinked, ethylene/vinyl acetate copolymers, olefinic homopolymers and copolymers of ethylene (or propylene or butylene), polyisobutylenes, polybutadienes, polyisoprenes, poly(vinyl chloride), reground rubbers or else any polymer used to modify bitumens, and blends thereof. An amount of polymer of from 2 to 10% by weight relative to the weight of bitumen is generally used.

Such bituminous binders or products may be used as is, for example for use thereof as sealing coats for roofs or road tack layers. Alternatively, they can be mixed with inorganic materials, for example in the form of aggregates, such as sand, gravel, etc.

Thus, in the field of the road construction industry, several techniques for the preparation of bituminous road materials are distinguished:

"cold" techniques, based on the use of bitumen emulsions as binder. The bitumen is then dispersed in the aqueous phase by mechanical action in the presence of surfactants. These techniques make it possible to use the binder and the aggregates at temperatures below 100° C. and generally at ambient temperature;

"hot" techniques use an anhydrous binder. The binder is rendered or kept fluid by heating to more than 100° C. generally. Among these techniques, there exist some for which the aggregates used are heated and dried at high temperature before contact with the binder. Coating can take place at a temperature in the vicinity of 140° C. or more, depending on the characteristics of the binder, in which case reference is made to hot bituminous mixes. In the techniques with the anhydrous binder, mention may also be made of the coats with cutback or fluxed bitumen, where the bitumen is rendered fluid by the addition of an optionally quick-drying "diluent";

"warm" techniques, which make it possible to carry out the operations described above at lower temperatures than those used for the hot techniques, in order to obtain warm bituminous mixes. Here again, a distinction may be made between the techniques employing temperatures of greater than 100° C. and those employing temperatures of less than 100° C., that is to say for which a contribution of heat energy for the production of the road material is necessary, while making possible the presence of liquid water in one of the steps of the process;

techniques using polymers which can be added to the bitumen so as to obtain bituminous products with improved mechanical properties. These bituminous products modified by polymers are used in road, urban or airport construction and also for leaktightness, for example using the abovementioned techniques. Polymers are large molecules formed by covalent chemical bonds between several repeat units or monomers. Modification of the bitumens with polymers having high molar masses (at least 10 000 g/mol) is generally necessary in order to improve the mechanical properties of the bituminous product. The modification of the bitumens by the polymers makes it possible to increase the flexibility at low temperature and to increase the softening point at high temperature. This also makes it possible to increase the cohesion and the modulus of the bitumen and also those of the road materials, thus increasing the rutting resistance or the tearing of the aggregates for example.

Regardless of the technique used among the various techniques described above, it is generally of use to combine the bituminous composition with an additive chosen as a function of the desired application.

Thus, in techniques using bitumen emulsions, two types of application are mainly distinguished:

coating techniques, of which mention may be made, for example, among the most widely used, of "grave emulsions", "cold-poured bituminous mixes" (CPBMs) or "dense cold bituminous mixes", spreading techniques with mainly "surface coatings" and "tack layers".

It is known that, in order to produce a good spreading emulsion, a quick-breaking emulsion is necessary in order for it to very rapidly destabilize after spraying. An emulsion which is stable on storage is also necessary in order to prevent breaking in the tanks or trucks and with good adhesiveness on all types of aggregate and support.

As a general rule, the emulsions which meet these criteria are cationic emulsions used at a pH of less than 7 and which give good adhesiveness on the majority of available aggregates. The emulsifiers generally used for these spreading techniques are thus cationic surfactants of the type of polyamine, amidoamines and imidazolines on fatty chains (12 to 22 carbon atoms) salified by strong acids and more generally hydrochloric acid.

The aim of the invention is to propose an emulsifying spreading composition having improved maturation while retaining good stability. This stability is all the more problematic the lower the doses of emulsifier for this type of emulsion and the more the quality of the bitumens to be emulsified decreases. There is also increasing demand for specialty spreading emulsions with hard bitumens (35/50 penetrability and less, measured according to NF EN 1426 of June 2007) or polymer-modified bitumens (SBS, EVA, Elvaloy, rubber crumb, etc.). These emulsions are very difficult to stabilize. Moreover, often when they are storage stable, they are then slow to destabilize on spreading.

There is therefore a real need for spreading emulsions which are storage stable, but which destabilize quickly after spraying. Furthermore, these emulsions must be adapted to complex bitumens, that is to say those of poor quality, high viscosity, or else those which are polymer-modified.

The problem of the storage stability of bitumen emulsions has already been dealt with in the past, and those skilled in the art know how to solve this problem by using a suitable dose of emulsifiers of the type of polyamines, amidoamines and imidazolines on fatty chains (12 to 22 carbon atoms) salified by strong acids and more generally hydrochloric acid. The more the bitumen emulsion is complicated to produce and to stabilize, the more the dose of emulsifier must be increased.

Likewise, those skilled in the art know how to improve the speed of destabilization of an emulsion by using a suitable dose of emulsifier of the type of polyamines, amidoamines and imidazolines on fatty chains (12 to 22 carbon atoms) salified by strong acids and more generally hydrochloric acid. The more rapidly the emulsion must destabilize on use, the lower the dose of emulsifier must be.

It can therefore be seen that the use of the parameter of dosage known to those skilled in the art cannot be used in cases in which the bitumen emulsion is complicated to produce and to stabilize but must destabilize rapidly after spraying onto the roadway, as is the case for example for surface coating emulsions with bitumens highly modified with SBS.

Document EP0416682 (SHELL Internationale Research Maatschappij) proposes an improvement in the breaking behavior of bitumen emulsions by using bituminous compositions comprising polymeric fatty acids. This document discloses the use of these specific acids for improving the properties of the bitumens. This document teaches the addition of specific acids into the bitumen in order to modify the properties thereof.

However, this solution, which consists in modifying the bitumen, may be adapted for a bitumen manufacturer but is particularly complex for emulsion manufacturers who do not have the equipment to additize the bitumen (highly expensive specific storage tank and dedicated feed line with metering pump).

Thus, there is currently no technical solution that leads both to the production of emulsifying spreading compositions for bitumens having improved storage stability and having improved breaking speed which can be used directly and easily by emulsion manufacturers without high equipment costs or without having to rely on a specific bitumen.

SUMMARY OF THE INVENTION

The subject of the invention is an aqueous acidic emulsifying composition comprising:
A) from 0.01 to 20% by weight, relative to the total weight of the aqueous composition, of at least one amine chosen from the amines of following formulae:
  i) an optionally alkoxylated fatty monoamine of following formula (I):

in which:
  $R_1$ represents a saturated or unsaturated, linear or branched carbon chain comprising 8 to 24 carbon atoms, preferentially 12 to 24 carbon atoms and even more preferentially 12 to 18 carbon atoms,
  $R_2$ and $R_3$, which are identical or different, represent a hydrogen atom, a linear or branched, saturated or unsaturated alkyl radical comprising 1 to 4 carbon atoms, or a $-(CH_2CHR_4O)_hH$ group, with $R_4$ representing a hydrogen atom, a methyl or ethyl radical, and h being an integer ranging from 1 to 10, preferentially from 1 to 3 and even more preferentially from 1 to 2, it being understood that if h>1, there are several groups $R_4$ as defined previously which may be identical or different,
  ii) an optionally alkoxylated fatty polyamine of following formula (II):

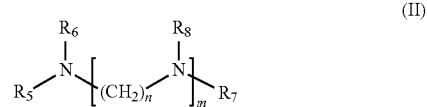

in which:
  $R_5$ represents a saturated or unsaturated, linear or branched carbon chain comprising 8 to 24 carbon atoms, preferentially 12 to 24 carbon atoms and even more preferentially 12 to 18 carbon atoms,
  $R_6$, $R_7$ and $R_8$, which are identical or different, represent a hydrogen atom, a linear or branched, saturated or unsaturated alkyl radical comprising 1 to 4 carbon atoms, or a $-(CH_2CHR_9O)_iH$ group, with
  $R_9$ representing a hydrogen atom, a methyl or ethyl radical, and
  i denoting an integer ranging from 1 to 10, preferentially from 1 to 3 and even more preferentially from 1 to 2;
  it being understood that if i>1 there are several groups $R_9$ as defined above and which may be identical or different,
  m denotes an integer between 1 and 6, preferentially between 1 and 4 and more preferentially 1 or 2, it being understood that if m>1 there are several groups $R_8$ as defined above and which may be identical or different,
  n denotes an integer between 1 and 6, preferentially between 2 and 4 and even more preferentially 2 or 3, iii) an optionally alkoxylated fatty amidoamine of following formula (IIIa) or the optionally alkoxylated cyclized equivalent thereof, of following formula (IIIb):

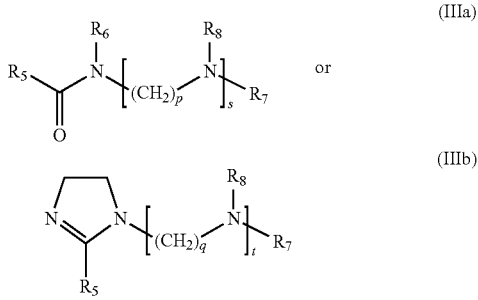

in which:
the groups $R_5$, $R_6$, $R_7$ and $R_8$ have the same meaning as in the formula (II),
p and q denote an integer between 1 and 6, preferentially between 1 and 4 and more preferentially 2,
s denotes an integer between 1 and 10, preferentially between 1 and 4 and even more preferentially 1, 2 or 3,
t denotes an integer between 0 and 9, preferentially between 0 and 3 and even more preferentially 0, 1 or 2,
it being understood that if s>1 or t>1, there are several groups $R_8$ as defined above and which may be identical or different, B) from 0.001% to 10% by weight, relative to the total weight of the aqueous composition, of at least one polymerized fatty acid having a molar mass greater than 350 g·mol$^{-1}$ and an acid number greater than 160 mg KOH·g$^{-1}$, according to standard ASTM D465 of 2005, C) less than 20% by weight, relative to the total weight of the aqueous composition, of at least one bitumen, and D) a water content strictly greater than 5% by weight relative to the total weight of the aqueous composition.

DETAILED DESCRIPTION OF THE INVENTION

When this composition is used for preparing bituminous emulsions, the breaking speed obtained is much higher. This composition has the advantage of being extremely easy to use. Moreover, it can be produced from equipment already existing in industry. This is because, when using this composition, it is unnecessary to additize the bitumen. The composition according to the invention may be used directly on non-additized bitumen.

Another subject of the invention is the process for preparing the composition according to the invention. Another subject of the invention is the process for preparing bituminous emulsions from the composition according to the invention.

The invention also relates to the use of the composition according to the invention for preparing bituminous emulsions for spreading, and especially stable emulsions. Another subject of the invention is the anhydrous composition which is a precursor of the aqueous composition defined above. Another subject of the invention is the process for preparing the anhydrous composition. Another subject of the invention is the process for preparing the composition according to the invention from the anhydrous composition.

Another subject of the invention is the process for preparing bituminous emulsions from the anhydrous composition. The invention also relates to the use of the anhydrous composition for preparing the composition according to the invention. The invention also relates to the use of the anhydrous composition for preparing bituminous emulsions for spreading, and especially stable emulsions.

In the present invention, the term "emulsion" is intended to mean a heterogeneous system comprising two or more liquid phases, consisting of a continuous liquid phase and at least one second liquid phase, dispersed in the first, in the form of fine droplets.

It is specified that the expressions "from . . . to . . . " and "between . . . and . . . " used in the present description must be understood as each including the stated limit values.

Aqueous Acidic Emulsifying Composition
Fatty Amines

The composition according to the invention comprises at least one amine chosen from the amines of following formulae:

i) an optionally alkoxylated fatty monoamine of following formula (I):

in which:
$R_1$ represents a saturated or unsaturated, linear or branched carbon chain comprising 8 to 24 carbon atoms, preferentially 12 to 24 carbon atoms and even more preferentially 12 to 18 carbon atoms,
$R_2$ and $R_3$, which are identical or different, represent a hydrogen atom, a linear or branched, saturated or unsaturated alkyl radical comprising 1 to 4 carbon atoms, or a —$(CH_2CHR_4O)_hH$ group, with $R_4$ representing a hydrogen atom, a methyl or ethyl radical, and h being an integer ranging from 1 to 10, preferentially from 1 to 3 and even more preferentially from 1 to 2; it is understood that if h>1, there are several groups $R_4$ as defined previously which may be identical or different.

Such amines are, for example, octylamine, nonylamine, decylamine, undecylamine, dodecylamine, tetradecylamine, hexadecylamine, octadecylamine, myristoleylamine, palmitoleylamine, oleylamine and fatty amines derived from mixtures of fatty acid of animal or plant origin, such as fatty amines of coconut, palm, olein or tallow. Such products are available for example from ARKEMA under the generic name Noram®.

The alkylated derivatives of these amines obtained by processes known to those skilled in the art are also part of this invention. Mention will be made, nonlimitingly, of myristyl dimethylamine, lauryl dimethylamine, oleyl dimethylamine, stearyl dimethylamine, tallow dimethylamine, coconut dimethylamine or palm dimethylamine and the corresponding diethylated or dipropylated derivatives and mixtures thereof.

The alkoxylated derivatives of these amines obtained by processes known to those skilled in the art are also part of this invention. Mention will be made, nonlimitingly, of ethoxylated fatty amines of tallow, coconut, palm, olein, and also the propoxylated and butoxylated derivatives and mixtures thereof. Such products are available for example from ARKEMA under the generic name Noramox®.

ii) an optionally alkoxylated fatty polyamine of following formula (II):

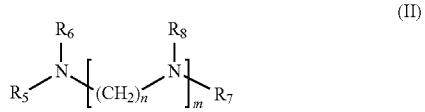
(II)

in which:

R$_5$ represents a saturated or unsaturated, linear or branched carbon chain comprising 8 to 24 carbon atoms, preferentially 12 to 24 carbon atoms and even more preferentially 12 to 18 carbon atoms, R$_6$, R$_7$ and R$_8$, which are identical or different, represent a hydrogen atom, a linear or branched, saturated or unsaturated alkyl radical comprising 1 to 4 carbon atoms, or a —(CH$_2$CHR$_9$O)$_i$H group, with R$_9$ representing a hydrogen atom, a methyl or ethyl radical, and i denoting an integer ranging from 1 to 10, preferentially from 1 to 3 and even more preferentially from 1 to 2;

it being understood that if i>1 there are several groups R$_9$ as defined above and which may be identical or different m denotes an integer between 1 and 6, preferentially between 1 and 4 and more preferentially 1 or 2, it being understood that if m>1 there are several groups R$_8$ as defined above and which may be identical or different, n denotes an integer between 1 and 6, preferentially between 2 and 4 and even more preferentially 2 or 3.

Such amines are, for example, N-coco-propylenediamine (CAS No. 61791-63-7), N-stearyl propylenediamine, N-oleyl propylenediamine (CAS No. 7173-62-8), N-tallow propylenediamine (CAS No. 61791-55-7), N-soya propylenediamine (CAS No. 61791-67-1), N-coco dipropylenetriamine, N-oleyl dipropylenetriamine (CAS No. 28872-01-7), N-tallow propylenetriamine (CAS No. 61791-57-9) and N-tallow tripropylenetetramine (CAS No. 68911-79-5). Such products are available for example from ARKEMA under the generic names Dinoram®, Trinoram® and Polyram®.

The alkylated derivatives of these polyamines obtained by processes known to those skilled in the art are also part of this invention. Mention will be made, for example, of N,N,N'-trimethyl-N'-tallow-propylenediamine (CAS No. 68783-25-5) available for example from Akzo under the trade name Duomeen® TTM and also the corresponding diethylated or dipropylated derivatives and mixtures thereof.

The alkoxylated derivatives of these polyamines obtained by processes known to those skilled in the art are also part of this invention. Mention will be made, nonlimitingly, of ethoxylated fatty polyamines of tallow, coconut, palm, olein, and also the propoxylated and butoxylated derivatives and mixtures thereof. Such products are available for example from ARKEMA under the generic name Dinoramox®.

iii) an optionally alkoxylated fatty amidoamine of following formula (IIIa), or the optionally alkoxylated cyclized equivalent thereof, of following formula (IIIb):

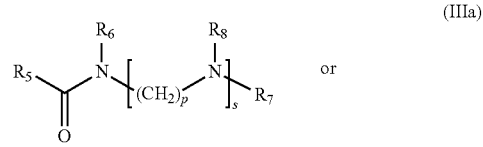
(IIIa)

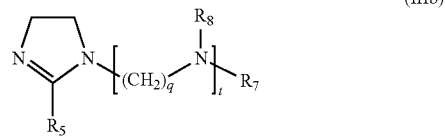
(IIIb)

in which:

the groups R$_5$, R$_6$, R$_7$ and R$_8$ have the same meaning as in the formula (II), p and q denote an integer between 1 and 6, preferentially between 1 and 4 and more preferentially 2, s denotes an integer between 1 and 10, preferentially between 1 and 4 and even more preferentially 1, 2 or 3, t denotes an integer between 0 and 9, preferentially between 0 and 3 and even more preferentially 0, 1 or 2, it is understood that if s>1 or t>1, there are several groups R$_8$ as defined above and which may be identical or different.

Such products, isolated or in a mixture of two or more thereof, are either known and commercially available, or easily prepared from procedures known to those skilled in the art, and for example by reaction between:

plant or animal oils (typically triglycerides) or fatty acids of different natures, such as fatty acids of coconut, tallow, palm, pine (or tall oil), octanoic, nonanoic, decanoic, undecanoic, dodecanoic, lauric, myristic, cetylic, stearic, oleic, arachidic, behenic acids, and polyethylenepolyamines such as diethylenetriamine (DETA), triethylenetetramine (TETA), tetraethylenepentamine (TEPA), aminoethyl piperazine (AEP) and pentaethylenehexamine (PEHA).

Other polyaminoalkylamines, such as dimethylaminopropylamine (DMAPA) or dimethylaminopropylaminopropylamine (DMAPAPA) may also be used for the reaction with said fatty acids.

The cyclized derivatives of formula (IIIb) are generally obtained by internal cyclization (thermal dehydration) of the corresponding compounds of formula (IIIa).

The component iii) is generally composed of a mixture between the non-cyclic compound of formula (IIIa) and its cyclized homologue of formula (IIIb).

Such products are for example the commercial emulsifiers such as Emulsamine® L60, Emulsamine® L70, Emulsamine® LZ, Emulsamine® L85, Polyram® L930 and Polyram® L920 sold by ARKEMA.

These amines, once introduced into the aqueous acidic composition according to the invention, are generally in cationic form.

According to a preferred embodiment of the invention, the composition comprises from 0.01% to 20% by weight of at least one amine of formula (I), and/or (II) and/or (IIIa) and/or (IIIb) defined above, more preferentially from 0.05% to 10% by weight, even more preferentially from 0.1% to 3% by weight and even more preferentially from 0.2% to 1% by weight relative to the total weight of the aqueous composition.

Fatty Acids

The composition according to the invention comprises at least one polymerized fatty acid. Polymerized fatty acids are well known to those skilled in the art and may for example be obtained by polymerization of at least one unsaturated fatty acid.

The unsaturated fatty acids which make it possible to obtain the polymerized fatty acids are generally and most commonly unsaturated fatty acids having from 4 to 24 carbon atoms (C4 to C24), preferably from 11 to 22 carbon atoms (C11 to C22), preferably from 16 to 18 carbon atoms (C16 to C18).

Among the unsaturated fatty acids making it possible to obtain the polymerized fatty acids, mention may for example be made of crotonic acid (C4), isocrotonic acid (C4), undecylenic acid (C11), hypogeic acid (C16), palmitoleic acid (C16), oleic acid (C18), elaidic acid (C18), vaccenic acid (C18), petroselinic acid (C18), gadoleic acid (C20), gondoic acid (C20), cetoleic acid (C22), erucidic acid (C22), brassidic acid (C22), nervonic acid (C24), tiglic acid (C5), sorbic acid (C6), linoleic acid (C18), hiragonic acid (C16), linolenic acid (C18), γ-linolenic acid (C18), eleostearic acid (C18), parinaric acid (C18), homo-γ-linolenic acid (C20), arachidonic acid (C20), clupanodonic acid (C22), taken alone or as mixtures.

Preferably, the unsaturated fatty acids are unsaturated fatty acids having 18 carbon atoms, in particular chosen from oleic acid, linoleic acid and linolenic acid, taken alone or as a mixture. It is also possible to polymerize mixtures of acids of natural origin, such as those originating from TOFA or "Tall Oil Fatty Acid" (rich in oleic acids and linoleic acids). It is possible to polymerize a fatty acid or a mixture containing several different fatty acids. The reaction making it possible to polymerize the chains of the fatty acids is, for example, a Diels-Alder reaction (for more information see "*Kirk Othmer Encyclopedia of Chemical Technology*", vol. 7, p. 768 or "The dimer acids", Humko Sheffield, (1975)).

The polymerization reaction is a dimerization, trimerization or tetramerization reaction leading respectively to fatty acid dimers (or diacid dimers), fatty acid trimers (or triacid trimers) or fatty acid tetramers (or tetracid tetramers). Traces of unreacted fatty acids may also be present (or fatty acid monomers).

Depending on the experimental conditions used, therefore, polymerized fatty acids are obtained comprising unreacted fatty acids (fatty acid monomers), fatty acid dimers, fatty acid trimers and fatty acid tetramers in various proportions. The polymerized fatty acids predominantly comprise fatty acid dimers and fatty acid trimers. Unreacted fatty acids (fatty acid monomers) or fatty acid tetramers are minor products.

Preferably, the polymerized fatty acids comprise at least 20% by weight of fatty acid dimers. More preferentially, the polymerized fatty acids comprise at least 75% by weight of fatty acid dimers. Among the commercially available polymerized fatty acids, mention may be made of PRIPOL® sold by Uniqema, Polymergin® sold by Harburger Brinckman & Mergell GmbH, Dimer® sold by Westvaco, Empol® sold by Cognis.

For example, Empol® 1008 comprises 3.5% by weight of unreacted C18 fatty acid, 92.3% by weight of C36 fatty acid dimer and 3.5% by weight of C54 fatty acid trimer.

For example, Empol® 1018 comprises 4% by weight of unreacted fatty acid, 79% by weight of fatty acid dimer and 17% by weight of fatty acid trimer.

For example, Empol® 1040 comprises 20% by weight of C36 fatty acid dimer and 80% by weight of C54 fatty acid trimer.

For example, Empol® 1041 comprises 10% by weight of C36 fatty acid dimer and 90% by weight of C54 fatty acid trimer.

For example, Empol® 1054 comprises 4% by weight of unreacted C18 fatty acid, 55% by weight of C36 fatty acid dimer and 35% by weight of C54 fatty acid trimer.

For example, Pripol® 1045 comprises 10% by weight of C36 fatty acid dimer and 90% by weight of C54 fatty acid trimer.

For example, Pripol® 1040 comprises 0.1% by weight of fatty acid monomer, 22.5% by weight of fatty acid dimer and 77% by weight of fatty acid trimer.

For example, Pripol® 1017 comprises 2% by weight of fatty acid monomer, 79% by weight of fatty acid dimer and 19% by weight of fatty acid trimer.

For example, Pripol® 1012 comprises 0.1% by weight of fatty acid monomer, 97% by weight of fatty acid dimer and 1.1% by weight of fatty acid trimer.

For example, Pripol® 1013 comprises approximately 0.1% by weight of fatty acid monomer, 97% by weight of fatty acid dimer and 3% by weight of fatty acid trimer.

The molar mass of the polymerized fatty acid is greater than 350 g·mol$^{-1}$, preferably greater than 500 g·mol$^{-1}$, and more preferentially between 500 g·mol$^{-1}$ and 1000 g·mol$^{-1}$. Preferably, the average molar mass of the polymerized fatty acids is between 500 g·mol$^{-1}$ and 800 g·mol$^{-1}$.

The acid number of the polymerized fatty acid is generally greater than 160 mg KOH·g$^{-1}$, preferably between 160 mg KOH·g$^{-1}$ and 320 mg KOH·g$^{-1}$, more preferably still between 180 mg KOH·g$^{-1}$ and 300 mg KOH·g$^{-1}$, according to standard ASTM D465 of 2005.

According to a preferred embodiment of the invention, the composition comprises from 0.001% to 10% by weight of polymerized fatty acid, more preferentially from 0.005% to 5% by weight of polymerized fatty acid, even more preferentially from 0.01% to 3% by weight of polymerized fatty acid and even more preferentially from 0.02% to 1% by weight of polymerized fatty acid relative to the total weight of the aqueous composition.

The weight ratio between the amine(s) and the polymerized fatty acid(s) is between 90/10 and 10/90, preferentially between 80/20 and 40/60, and more preferentially between 70/30 and 50/50.

The composition according to the invention is an aqueous composition. It comprises a water content strictly greater than 5% by weight relative to the total weight of the aqueous composition.

It is also acidic. For the purposes of the present invention, acidic is intended to mean that the pH of the aqueous composition is less than 7, preferably less than 6; more preferably still, it is between 0.5 and 5, and more particularly, it is between 1 and 4. It may be adjusted by adding a strong or weak organic or inorganic acid to the composition. Preferably, the pH is adjusted for example by adding phosphoric acids, hydrochloric acid or acetic acid.

The composition according to the invention optionally comprises less than 20% by weight, preferably from 0 to 10%, more preferentially from 0 to 5% by weight of bitumen relative to the total weight of the aqueous composition. The composition preferably does not contain bitumen.

According to a preferred embodiment of the invention, the remainder up to 100% by weight of the composition according to the invention consists of water, optionally of the acid(s) making it possible to adjust the pH as indicated previously, and optionally of one or more additives and/or fillers well known to those skilled in the art.

Among the additives and/or fillers, mention may be made, nonlimitingly, of latices, rheological additives (for example viscosifying agents), dyes, preservatives, antioxidants, surfactants, mineral fillers, electrolytes (aluminum sulfate, calcium chloride, for example), hydrotropes, and others.

According to a preferred embodiment of the invention, the composition according to the invention is the aqueous phase usually used during the preparation of bituminous emulsions.

Process for Preparing the Emulsifying Composition

The aqueous composition according to the invention may be prepared by any means well known to those skilled in the art by simple mixing of the various components which constitute it, and for example at a temperature generally between ambient temperature and 60° C.

In a particular embodiment of the invention, the process comprises a step of adding, to an aqueous phase, an anhydrous composition comprising:
 at least one amine as described above, that is to say at least one of the amines of formula (I) and/or of formula (II) and/or of formula (IIIa) and/or of formula (IIIb) and
 at least one polymerized fatty acid as described above.

The aqueous solution to which the anhydrous composition is added comprises water, optionally one or more acids making it possible to adjust the pH, and optionally one or more additives and/or fillers well known to those skilled in the art, as indicated previously. This solution may be heated prior to, or during, the mixing with the anhydrous composition. The pH of the final composition may also be adjusted by adding acid(s).

This composition may be very easily prepared using an existing production unit.

Anhydrous Composition

The invention also targets the anhydrous composition described in the preceding paragraph, which is used for the preparation of the aqueous acidic emulsifying composition.

As defined above, the anhydrous composition comprises:
 at least one amine as described above, that is to say at least one of the amines of formula (I), of formula (II), of formula (IIIa), of formula (IIIb) and
 at least one polymerized fatty acid as described above.

For the purposes of the present invention, anhydrous is intended to mean that the composition comprises a water content of less than 5% by weight of the total weight of the composition, preferably less than 1% by weight. Preferably, the anhydrous composition does not contain water.

According to a preferred embodiment of the invention, the anhydrous composition comprises from 10% to 90% by weight of amine, more preferentially from 30% to 90% by weight of amine, even more preferentially from 40% to 80% by weight of amine and even more preferentially from 50% to 70% by weight of amine as described above, relative to the total weight of the anhydrous composition.

According to a preferred embodiment of the invention, the anhydrous composition comprises from 10% to 90% by weight of polymerized fatty acid, more preferentially from 20% to 60% by weight of polymerized fatty acid, even more preferentially from 30% to 50% by weight of polymerized fatty acid, relative to the total weight of the anhydrous composition.

The weight ratio between the amine(s) and the polymerized fatty acid(s) in the anhydrous composition is between 90/10 and 10/90, preferentially between 80/20 and 40/60, and more preferably between 70/30 and 50/50.

This anhydrous composition has the advantage of being very simple to handle for the preparers, and can also be very easily mixed with the aqueous solution.

Use of the Anhydrous Composition

As described above, another subject of the invention is the use of the anhydrous composition as defined above for preparing the aqueous acidic emulsifying composition according to the invention.

Another subject of the invention is the use of the anhydrous composition as defined above for preparing a bituminous emulsion for spreading.

Process for Preparing a Bituminous Emulsion

The invention also relates to the process for preparing a bituminous emulsion. The process comprises at least one step of mixing a bitumen and the aqueous acidic emulsifying composition according to the invention.

The advantage of this process is that it is extremely simple and it does not require additional prior steps for treating the bitumen.

Advantageously, said process for preparing the bituminous emulsion according to the invention is carried out according to the methods well known to those skilled in the art, and for example as described in the manual "Les émulsions de bitume" ["Bitumen emulsions"] published by the Revue Générale des Routes et des Aerodromes [General Review of Roads and Aerodromes] (RGRA) (2006).

According to a preferred embodiment according to the invention, the process consists of a single step of mixing a bitumen and the aqueous acidic emulsifying composition according to the invention.

Bitumens

The bitumens used in the present invention are bitumens from various origins. Mention may first of all be made of bitumens of natural origin, those contained in natural bitumen deposits, natural asphalt deposits, or tar sands. These bitumens are those described in the introduction.

The bitumens according to the invention are also bitumens originating from the refining of crude oil. The bitumens originate from the atmospheric and/or vacuum distillation of petroleum. These bitumens can optionally be blown, visbroken and/or deasphalted. The bitumens may be hard-grade or soft-grade bitumens. The various bitumens obtained by means of refining processes can be combined together to obtain the best technical compromise.

The bitumens used can also be bitumens fluxed by the addition of volatile solvents, of fluxes of petroleum origin, of carbochemical fluxes and/or of fluxes of plant origin.

Polymer-modified bitumens may also be used. As polymer, mention may for example, and by way of nonlimiting indication, be made of thermoplastic elastomers such as linear or star-branched styrene/butadiene (SBR, SBS) or styrene/isoprene (SIS) random or block copolymers, which are optionally crosslinked, ethylene/vinyl acetate copolymers, olefinic homopolymers and copolymers of ethylene (or propylene or butylene), polyisobutylenes, polybutadienes, polyisoprenes, poly(vinyl chloride), reground rubbers or else any polymer used to modify bitumens, and blends thereof. An amount of polymer of from 2% to 10% by weight relative to the weight of bitumen is generally used.

Synthetic bitumens, also known as clear, pigmentable or colorable bitumens, may also be used. These bitumens contain little or no asphaltenes and can consequently be colored. These synthetic bitumens are based on petroleum resin and/or on indene-coumarone resin and on lubricating oil, as described for example in patent EP179510.

Advantageously, the bitumen is a bitumen with a penetrability, measured according to the standard NF EN 1426 of June 2007, ranging from 10 to 300, preferentially from 20 to 220, more preferentially from 50 to 220. Preferably, the bitumen according to the invention is chosen from unmodified bitumens from the refining of crude oil.

Use of the Composition According to the Invention

The invention finally relates to the use of the aqueous acidic emulsifying composition according to the invention for preparing a bituminous emulsion for spreading.

The invention is illustrated by the following nonlimiting examples.

EXAMPLES

Example 1

1. Preparation of an Anhydrous Composition

In order to prepare 1 kg of an anhydrous composition according to the invention, 670 g of Dinoram® S (tallow diamine, CAS No. 61791-55-7, sold by ARKEMA), melted beforehand at 60° C., are introduced into a round-bottomed flask. The diamine amine is stirred under an inert atmosphere and 330 g of Pripol® 1017 (fatty acid dimer sold by CRODA) are added. A rise in viscosity is noted when approximately 70% of the pouring is reached. The mixture is subsequently maintained at 70° C. for one hour. It is emptied into a bottle after taking off samples for analysis. The product is a waxy solid when cold, which has a melting point around 25° C.

2. Preparation of Aqueous Compositions

In order to prepare 1 kg of an anhydrous composition according to the invention, 670 g of Dinoram® S (tallow diamine, CAS No. 61791-55-7, sold by ARKEMA), melted beforehand at 60° C., are introduced into a round-bottomed flask. The diamine amine is stirred under an inert atmosphere and 330 g of Pripol® 1017 (fatty acid dimer sold by CRODA) are added. A rise in viscosity is noted when approximately 70% of the pouring is reached. The mixture is subsequently maintained at 70° C. for one hour. It is emptied into a bottle after taking off samples for analysis. The product is a waxy solid when cold, which has a melting point around 25° C.

Aqueous compositions are prepared by mixing the amount of emulsifier as indicated in table 1 below with water heated to 45° C. The pH of the aqueous phases is adjusted to 2 by the addition of 32% hydrochloric acid.

The compositions A1 to A3 are comparative aqueous compositions, while the compositions A4 and A5 are aqueous compositions according to the invention. The contents are expressed in grams.

TABLE 1

|  | A1 | A2 | A3 | A4 | A5 |
|---|---|---|---|---|---|
| Amine (1) | 2.3 | 2.3 | 2.3 | 2.3 | — |
| Anhydrous composition according to §1 Ex1 | — | — | — | — | 3.45 |
| Capric acid | — | 1.15 | — | — | — |
| Oleic acid | — | — | 1.15 | — | — |
| Fatty acid (2) | — | — | — | 1.15 | — |
| Hydrochloric acid | 2.1 | 2.3 | 1.9 | 1.9 | 1.9 |
| Water (q.s. to) | 100 | 100 | 100 | 100 | 100 |

(1) Dinoram ® S sold by ARKEMA is a tallow diamine of CAS No. 61791-55-7.
(2) The polymerized fatty acid Pripol ® 1017 comprises, according to the technical sheet from the supplier Croda, approximately 2% by weight of fatty acid monomer, 78% by weight of fatty acid dimer and 20% by weight of fatty acid trimer.

3. Preparation of the Bituminous Emulsions

The bitumen emulsions were obtained with a RINK ELEKTRO brand mill. The content by weight of bitumen is 60%. The bitumen used is a paraffinic bitumen with 70/100 penetrability, supplied by Total and originating from the Feyzin refinery in France. The temperature of the bitumen during the emulsification is 140° C.

To prepare the emulsions, the aqueous phase is introduced into the funnel of the mill before it is started. The aqueous phase is recirculated in the mill and the amount of bitumen necessary to obtain the desired concentration of bitumen is then gradually added to the recirculating aqueous phase. The total time of introduction of the bitumen is approximately 1 minute. The circuit is then drained and the emulsion recovered for analysis.

Table 2 below gives the contents of the components of the bituminous emulsions.

TABLE 2

|  | B1 | B2 | B3 | B4 | B5 |
|---|---|---|---|---|---|
| Aqueous phase A1 | 400 | — | — | — | — |
| Aqueous phase A2 | — | 400 | — | — | — |
| Aqueous phase A3 | — | — | 400 | — | — |
| Aqueous phase A4 | — | — | — | 400 | — |
| Aqueous phase A5 | — | — | — | — | 400 |
| Bitumen | 600 | 600 | 600 | 600 | 600 |

4. Evaluation of the Bituminous Emulsions

The emulsions are subsequently analyzed to determine their quality and their application properties.

The quality of the emulsion is assessed by the residue on 0.5 mm screens after manufacture (measured according to standard NF EN 1429 of December 1999) and the particle size analysis carried out using a Mastersizer 3000 particle size analyzer from Malvern.

The particle size analyzer is set up as follows:

refractive index at 1.625 for the bitumen with an imaginary part at 0.002 and refractive index of 1.33 for the water.

The value given in table 3 as the median diameter of the emulsion corresponds to the value Dv (0.5) given by the apparatus, that is to say the maximum value of the diameter of the dispersed bitumen particles representing 50% of the volume of the emulsion.

Breaking Index

The quality of the destabilization after application is assessed using the breaking index measured with Sikaisol filler according to the procedure described in standard NF EN 13075-1 (September 2002).

The lower this index, the more the emulsion will tend to destabilize rapidly after application, leading to maturation and rapid reopening to traffic.

TABLE 3

|  | B1 | B2 | B3 | B4 | B5 |
|---|---|---|---|---|---|
| Retention on 0.5 mm screen (weight %) | <0.1 | <0.1 | <0.1 | <0.1 | <0.1 |
| Dv (0.5) μm | 5.3 | 5.0 | 6.0 | 5.3 | 5.2 |
| Breaking index | 120 ± 5 | 123 ± 5 | 118 ± 5 | 90 ± 5 | 89 ± 5 |

It can be seen from these results that the addition of fatty acid with a constant amine dosage does not disrupt the quality of the emulsion (with the possible exception of oleic acid which slightly degrades the median diameter) but that only the polymerized fatty acid Pripol 1017® has a significant impact on the breaking index, indicating quicker destabilization under application conditions.

Example 2

1. Preparation of the Compositions

Aqueous compositions are prepared by mixing the amount of emulsifier as indicated in table 4 below with water heated to 45° C. The pH of these aqueous phases is adjusted to 2 by the addition of 32% hydrochloric acid.

Composition A6 is a comparative composition, while composition A7 is a composition according to the invention. The contents are expressed in grams.

TABLE 4

|  | A6 | A7 |
|---|---|---|
| Amine (1) | 2.3 | 2.3 |
| Fatty acid (2) | — | 1.15 |
| Hydrochloric acid | 2.7 | 2.7 |
| Water (q.s. to) | 100 | 100 |

(1) Dinoram ® S (sold by ARKEMA) is a tallow diamine of CAS No. 61791-55-7.
(2) The polymerized fatty acid Pripol ® 1017 comprises, according to the technical sheet from the supplier Croda, approximately 2% by weight of fatty acid monomer, 78% by weight of fatty acid dimer and 20% by weight of fatty acid trimer.

2. Preparation of the Bituminous Emulsions

Three bituminous emulsions are produced with an Emulbitume® emulsification pilot fitted with a colloid mill of Atom ix C type. The bituminous emulsions contain 60% by weight of bitumen, with 70/100 penetrability, originating from Total's Feyzin refinery, relative to the total weight of the emulsion. The emulsification is carried out in a standard manner at the flow rate of 60 liters·h$^{-1}$. The bitumen/aqueous phase mixture at the weight ratio (60/40) is introduced into the Atomix C by means of two separate circuits fed by two pumps. The temperature of the bitumen during the emulsification is 140° C.

For the emulsion B8, the aqueous phase used is the aqueous phase A6. The fatty acid is introduced into the bitumen, under hot conditions and with stirring (Rayneri) with a homogenization time of 15 minutes, according to the teaching of document EP0416682 from SHELL Internationale Research Maatschappij.

Table 5 below gives the contents of the components of the bituminous emulsions.

TABLE 5

|  | B6 | B7 | B8 |
|---|---|---|---|
| Aqueous phase A6 | 400 | — | 400 |
| Aqueous phase A7 | — | 400 | — |
| Fatty acid (3) | — | — | 1.15 |
| Bitumen | 600 | 600 | 600 |

(3) The polymerized fatty acid Pripol ® 1017 comprises, according to the technical sheet from the supplier Croda, approximately 2% by weight of fatty acid monomer, 78% by weight of fatty acid dimer and 20% by weight of fatty acid trimer.

3. Evaluation of the Bituminous Emulsions

The emulsions are subsequently analyzed to determine their quality and their application properties.

The quality of the emulsion is assessed by the residue on 0.5 mm screens after manufacture (measured according to standard NF EN 1429 of December 1999) and the particle size analysis carried out using a Mastersizer 3000 particle size analyzer from Malvern.

The particle size analyzer is set up as follows:
refractive index at 1.625 for the bitumen with an imaginary part at 0.002 and
refractive index of 1.33 for the water.

The value given in table 6 as the median diameter of the emulsion corresponds to the value Dv (0.5) given by the apparatus, that is to say the maximum value of the diameter of the dispersed bitumen particles representing 50% of the volume of the emulsion.

Breaking Index

The quality of the destabilization after application is assessed using the breaking index measured with Sikaisol filler according to the procedure described in standard NF EN 13075-1 (September 2002).

The lower this index, the more the emulsion will tend to destabilize rapidly after application, leading to maturation and rapid reopening to traffic.

TABLE 6

|  | B6 | B7 | B8 |
|---|---|---|---|
| Retention on 0.5 mm screen (weight %) | <0.1 | <0.1 | <0.1 |
| Dv (0.5) μm | 3.8 | 4.1 | 3.9 |
| Breaking index | 128 ± 5 | 102 ± 5 | 118 ± 5 |

These results show that the combination of fatty acid and amine within an aqueous phase has a significant impact on the breaking index.

The comparison of the results for the emulsions B7 and B8 show that, when the acid is introduced into the aqueous phase (emulsion B7), and not into the bitumen (emulsion B8) as taught by the prior art, an even quicker destabilization is obtained.

These two examples show that the choice of the amine(s) and polymerized fatty acid(s), and also their mode of introduction into the bituminous emulsion, are critical for obtaining a good quality emulsion and leading to rapid destabilization under the conditions of application.

The invention claimed is:

1. An aqueous acidic emulsifying composition comprising:

A) from 0.01 to 20% by weight, relative to the total weight of the aqueous composition, of an optionally alkoxylated fatty polyamine, and optionally at least one chosen from an optionally alkoxylated fatty monoamine and an optionally alkoxylated fatty amidoamine:

i) the optionally alkoxylated fatty monoamine being of following formula (I):

wherein:

$R_1$ represents a saturated or unsaturated, linear or branched carbon chain comprising 8 to 24 carbon atoms, $R_2$ and $R_3$, which are identical or different, represent a hydrogen atom, a linear or branched, saturated or unsaturated alkyl radical comprising 1 to 4 carbon atoms, or a —(CH$_2$CHR$_4$O)$_h$H group, with $R_4$ representing a hydrogen atom, a methyl or ethyl radical, and h being an integer ranging from 1 to 10, wherein if h>1, there are several groups $R_4$ which may be identical or different, ii) the optionally alkoxylated fatty polyamine being of following formula (II):

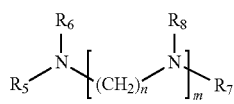

wherein:
R$_5$ represents a saturated or unsaturated, linear or branched carbon chain comprising 8 to 24 carbon atoms,
R$_6$, R$_7$ and R$_8$, which are identical or different, represent a hydrogen atom, a linear or branched, saturated or unsaturated alkyl radical comprising 1 to 4 carbon atoms, or a —(CH$_2$CHR$_9$O)$_i$H group, with
R$_9$ representing a hydrogen atom, a methyl or ethyl radical, and
i denoting an integer ranging from 1 to 10,
wherein if i>1 there are several groups R$_9$ as defined above and which may be identical or different,
m denotes an integer between 1 and 6, wherein if m>1 there are several groups R$_8$ as defined above and which may be identical or different,
n denotes an integer between 1 and 6,
iii) the optionally alkoxylated fatty amidoamine being of following formula (IIIa) or the optionally alkoxylated cyclized equivalent thereof, of following formula (IIIb):

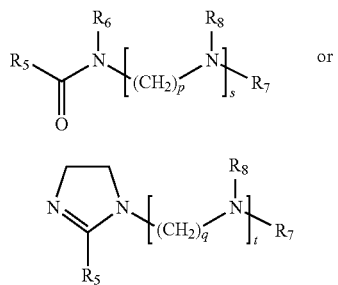

wherein:
the groups R$_5$, R$_6$, R$_7$ and R$_8$ have the same meaning as in the formula (II),
p and q denote an integer between 1 and 6,
s denotes an integer between 1 and 10,
t denotes an integer between 0 and 9,
wherein if s>1 or t>1, there are several groups R$_8$ defined above and which may be identical or different,
B) from 0.001% to 10% by weight, relative to the total weight of the aqueous composition, of at least one polymerized fatty acid having a molar mass greater than 350 g·mol$^{-1}$ and an acid number greater than 160 mg KOH g$^{-1}$, according to standard ASTM D465 of 2005,
C) less than 20% by weight, relative to the total weight of the aqueous composition, of at least one bitumen, and
D) a water content greater than 5% by weight relative to the total weight of the aqueous composition.

2. The aqueous composition as claimed in claim 1, wherein the amines of formulae (I), (II), (IIIa) and (IIIb) are chosen from octylamine, nonylamine, decylamine, undecylamine, dodecylamine, tetradecylamine, hexadecylamine, octadecylamine, myristoleylamine, palmitoleylamine, oleylamine; fatty amines of coconut, palm, olein or tallow, myristyl dimethylamine, lauryl dimethylamine, oleyl dimethylamine, stearyl dimethylamine, tallow dimethylamine, coconut dimethylamine, palm dimethylamine; the corresponding diethylated or dipropylated derivatives, ethoxylated fatty amines of tallow, coconut, palm, olein, and also the propoxylated and butoxylated derivatives; N-coco-propylenediamine, N-stearyl propylenediamine, N-oleyl propylenediamine, N-tallow propylenediamine, N-soya propylenediamine, N-coco dipropylenetriamine, N-oleyl dipropylenetriamine, N-tallow propylenetriamine and N-tallow tripropylenetetramine; N,N,N'-trimethyl-N'-tallow propylenediamine and also the corresponding diethylated or dipropylated derivatives; ethoxylated fatty polyamines of tallow, coconut, palm, olein, and also the propoxylated and butoxylated derivatives; and mixtures thereof; dimethylaminopropylamine (DMAPA) or dimethylaminopropylaminopropylamine (DMAPAPA) and mixtures thereof.

3. The aqueous composition as claimed in claim 1, wherein the at least one polymerized fatty acid is obtained by polymerization of at least one unsaturated fatty acid selected from crotonic acid (C4), isocrotonic acid (C4), undecylenic acid (C11), hypogeic acid (C16), palmitoleic acid (C16), oleic acid (C18), elaidic acid (C18), vaccenic acid (C18), petroselinic acid (C18), gadoleic acid (C20), gondoic acid (C20), cetoleic acid (C22), erucidic acid (C22), brassidic acid (C22), nervonic acid (C24), tiglic acid (C5), sorbic acid (C6), linoleic acid (C18), hiragonic acid (C16), linolenic acid (C18), γ-linolenic acid (C18), eleostearic acid (C18), parinaric acid (C18), homo-γ-linolenic acid (C20), arachidonic acid (C20), clupanodonic acid (C22), taken alone or as mixtures.

4. The aqueous composition as claimed in claim 1, wherein the acid number of the at least one polymerized fatty acid is between 160 mg KOH·g$^{-1}$ and 320 mg KOH·g$^{-1}$, according to standard ASTM D465 of 2005.

5. The aqueous composition as claimed in claim 1, wherein the composition comprises from 0.05% to 10% by weight of the optionally alkoxylated fatty polyamine of formula (II), and optionally at least one chosen from the optionally alkoxylated fatty monoamine of formula (I) and the optionally alkoxylated fatty amidoamine of formula (IIIa) or (IIIb), relative to the total weight of the aqueous composition.

6. The aqueous composition as claimed in claim 1, comprising from 0.005% to 5% by weight of the at least one polymerized fatty acid, relative to the total weight of the aqueous composition.

7. The aqueous composition as claimed in claim 1, wherein the weight ratio between the amine and the at least one polymerized fatty acid is between 90/10 and 10/90.

8. The aqueous composition as claimed in claim 1, wherein the pH thereof ranges from 0.5 to 5.

9. A process for preparing at least one bituminous emulsion comprising at least one step of mixing at least one composition as defined in claim 1 with a bitumen.

10. An anhydrous composition comprising:
the amine and the at least one polymerized fatty acid as defined in claim 1.

11. The anhydrous composition as claimed in claim 10, comprising from 10% to 90% by weight of the amine, relative to the total weight of the anhydrous composition.

12. The anhydrous composition as claimed in claim 10, comprising from 10% to 90% by weight of the at least one polymerized fatty acid, relative to the total weight of the anhydrous composition.

13. The anhydrous composition as claimed in claim 10, wherein the weight ratio between the amine and the at least one polymerized fatty acid in the anhydrous composition is between 90/10 and 10/90.

14. A process for preparing an aqueous acidic emulsifying emulsion, comprising at least one step of mixing:
   at least one composition as defined in claim 10 with an aqueous phase.

15. A bituminous spreading emulsion comprising the aqueous acidic emulsifying composition as defined in claim 1.

16. A bituminous spreading emulsion comprising the anhydrous composition as defined in claim 10.

* * * * *